J. H. RYALLS.
REVERSIBLE TRANSMISSION FOR SPINNING MULES.
APPLICATION FILED AUG. 13, 1920.
1,396,883.
Patented Nov. 15, 1921.
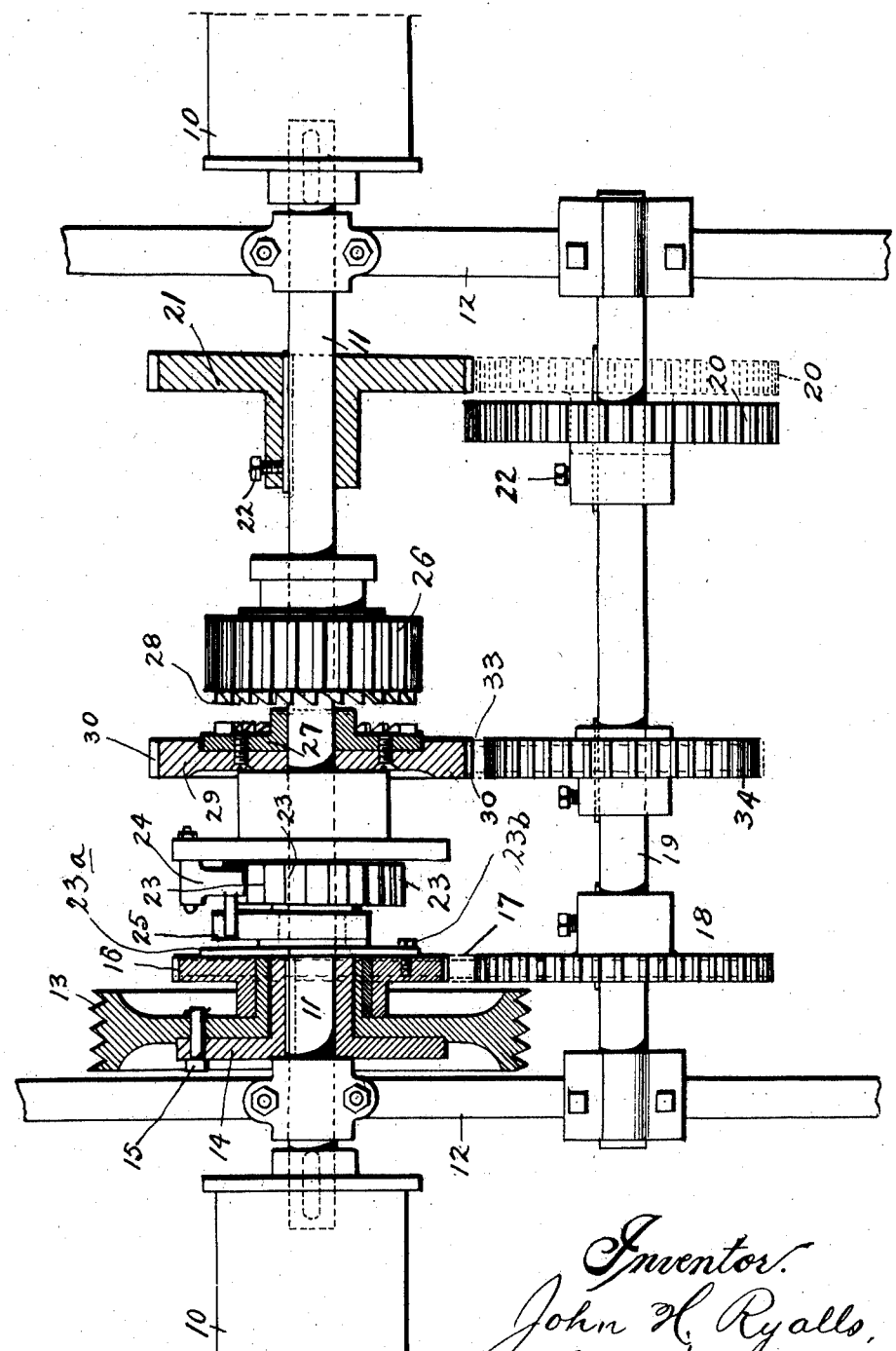
Inventor.
John H. Ryalls,
by Chas. J. Williamson
Atty.

UNITED STATES PATENT OFFICE.

JOHN H. RYALLS, OF CHARLOTTESVILLE, VIRGINIA.

REVERSIBLE TRANSMISSION FOR SPINNING-MULES.

1,396,883.           Specification of Letters Patent.     Patented Nov. 15, 1921.

Application filed August 13, 1920. Serial No. 403,193.

*To all whom it may concern:*

Be it known that I, JOHN H. RYALLS, a citizen of the United States, residing at Charlottesville, in the county of Albemarle and State of Virginia, have invented certain new and useful Improvements in Reversible Transmission for Spinning-Mules, of which the following is a specification, reference being had therein to the accompanying drawing.

The object of my invention is to provide means whereby, with a minimum of labor, and no cutting or other substantial structural alterations of the spinning mules as originally made, the latter, when constructed without provision for reversing the twist, save by the tedious, expensive and otherwise objectionable procedure of hand reversal of the driving bands, may reverse the direction of twist, and to attain such object my invention consists in the reversible transmission mechanism for spinning mules constructed substantially as hereinafter specified and claimed.

In the annexed drawings:—

Figure 1 is a top plan view, with parts in section, of enough of a spinning mule, to illustrate one embodiment of my invention; and Fig. 2 is a like view showing another embodiment of said invention.

Since my object more particularly is to equip spinning mules already in use, with reversible transmission mechanism, the problem involved is a difficult one because of the limited space available for mechanism additional to that with which the machine in its original construction is equipped, the necessity of preserving certain characteristic parts and motions, and objection to consuming much time in equipping the mule, because during such operation, the machine, of course, is out of use. It is a feature of my invention not to displace the tin cylinder shaft, but to retain it, as thereby serious cutting of original parts is avoided, but as that involves the reversal of the direction of revolution of that shaft in order to give either right or left twist, and as there are certain motions derived from said shaft whose direction is in constant relation to one direction of revolution of said shaft and cannot change with change of direction of its revolution, first for right twist and then for left twist, those skilled in the art will appreciate the difficulties in the way of such an accomplishment.

Referring now, with some detail, to what is shown in the drawing, 10 designates the two alining cylinders from which bands run to the spindles, and which are keyed to the ends of the cylinder shaft 11 supported in bearings in the two inner end frames 12 of the carriage, and upon which shaft is mounted the usual driving rope pulley 13, which however, is loose from said shaft, so that, independently of the direction of revolution of the pulley, the shaft may revolve either in the same or the opposite direction. Keyed to the cylinder shaft, alongside the rope pulley, and with its hub inside and journaling the latter, is a disk 14 which is detachably connected, rotatably, with the rope pulley, by a removable pin 15 that enters alining holes in disk and pulley. When disk and rope pulley are rotatably connected, the cylinder shaft and the spindles are directly revolved in the same direction as the pulley revolves. Keyed on the pulley hub, to always turn therewith, is a sprocket wheel 16, connected by a chain 17 with a sprocket wheel 18 fixed to a jack shaft 19 journaled at its ends in bearings secured to the carriage frames 12, and thereby said jack shaft is revolved in the same direction as the rope pulley. Splined to said jack shaft is a spur gear 20 meshing with a spur gear 21 splined to the cylinder shaft, each of said gears having a set screw 22 passing through its hub to the shaft on which it is splined, so that either may be shifted along its shaft to unmesh it with or mesh it with its mate, according as the rotation of the cylinder shaft is to be direct from the rope pulley for one twist, in which case the gears 20 and 21 are unmeshed; or indirectly and through the jack shaft for the other twist, in which case the gears 20 and 21 mesh.

To cause the customary back-off motion with either twist, I attach the usual back-off rachet 23 to the sprocket wheel 16 which always rotates with the rope pulley 13, said ratchet 23 being thus loose on the shaft 11. The ratchet 23 has a hub, on which the usual back-off spring 25 is frictionally mounted so as to act in the customary way upon the back-off pawl 24. The connection between ratchet 23 and wheel 16 may be a disk 23ᵃ on the ratchet hub through which bolts 23ᵇ pass to the wheel.

Instead of fixing the usual slidable winding gear pinion 26 to the cylinder shaft, I place it loose thereon, so that its direction of revolution is determined by the travel of the carriage, as usual, and is independent of said shaft. Loose on the cylinder shaft is a clutch disk 27 to co-act with the usual clutch face 28 on the winding-gear pinion, and connected rotatably with said clutch disk is a wheel 29 having sprocket teeth 30, connected by a chain 33 with a sprocket wheel 34 splined on the jack shaft.

The revolution of the winding pinion 26 is, of course, always in the same direction during the unwinding action of the chain on the drum or scroll and if the rope pulley 13 is loose from the disk 14 by the removal of the pin 15, the motion of the pinion 26 is transmitted to the wheel 29, to which it is then clutched and from the wheel 29, through the jack shaft 19 and the then meshing gears 20 and 21, to the cylinder shaft 11. If, however, the pulley 13 and disk 14 are rotatively connected by the pin 15 as shown in the drawing, at which time the gears 20 and 21 are out of mesh, then by the clutching of the pinion 26 and the wheel 29, the motion of the pinion 26 is transmitted through the jack shaft 19 and the sprocket wheels 16 and 18 to the cylinder shaft 11. Thus, whether the twist be right or left, the winding gear rotates the shaft 11 in the right direction to effect the winding of the threads upon the bobbins after the backing-off motion. Although the backing-off ratchet 23 has a constant direction of rotation, yet the turning of the cylinder shaft 11 for the backing-off motion is bound to occur in the right direction, whether the twist be right or left, because the backing-off ratchet 23, being rotatively connected with the sprocket wheel 16, causes the cylinder shaft 11 to rotate in one direction when the pin 15 connects the rope pulley (and therefore the sprocket 16) with the disk 14 which is keyed to the shaft 11 and rotation of shaft 11 in the opposite direction is caused by the backing-off ratchet 23 when the pin 15 is removed to disconnect pulley 13 and disk 14, because at that time, motion from the backing-off ratchet 23 is transmitted by way of sprockets 16 and 18 to jack shaft 19, and also at that time, the gears 20 and 21 are in mesh which cause revolution of the cylinder shaft 11 from the jack shaft.

I claim:—

1. In a reversible transmission for spinning mules, the combination of a cylinder shaft, a driving pulley loose therefrom, a rotatable member fixed to the shaft, means to connect said member with the pulley to drive the shaft in one direction, and means to drive the shaft in the opposite direction comprising a jack shaft, a driving connection between the pulley and the jack shaft, and a separable driving connection between the two shafts.

2. In a reversible transmission for spinning mules, the combination of a cylinder shaft, a driving pulley loose therefrom, a rotatable member fixed to the shaft, means to connect said member with the pulley to drive the shaft in one direction, means to drive the shaft in the opposite direction, comprising a jack shaft, a driving connection between the pulley and the jack shaft, and a separable driving connection between the two shafts and backing-off mechanism loose from said cylinder shaft and operatively connected with said jack shaft.

3. In a reversible transmission for spinning mules, the combination of a cylinder shaft, a driving pulley loose therefrom, a disk fixed to the shaft, a detachable driving connection between the disk and the pulley, a gear fixed to the pulley, a jack shaft operatively connected with said gear, and a reverse gear train between the two shafts.

4. In a reversible transmission for spinning mules, the combination of a cylinder shaft, means to revolve the same in opposite directions, for right and left twist, including a jack shaft, winding mechanism, including a rotating member mounted directly on but loose from said cylinder shaft, and means for operatively connecting and disconnecting said member and said jack shaft.

5. In a reversible transmission for spinning mules, the combination of a cylinder shaft, means to revolve the same in opposite directions, for right and left twist, including a jack shaft, a backing-off mechanism, having a rotating member mounted directly on but loose from the cylinder shaft, and operatively connected with said means, winding mechanism including a rotating member loose on the cylinder shaft, and means for operatively connecting and disconnecting said member and said jack shaft.

In testimony whereof I hereunto affix my signature.

JOHN H. RYALLS.